UNITED STATES PATENT OFFICE 2,293,389

KNOT STRENGTH

Harold L. Hearns, Midland, Mich., assignor to The Dow Chemical Company, Midland, Mich., a corporation of Michigan No Drawing. Application May 15, 1941, Serial No. 393,663

4 Claims. (Cl. 289—1)

This invention relates to a method of improving the knot strength of filaments of crystalline polymers.

The polymer of vinylidene chloride alone, many of its co-polymers, and their plasticized compositions are crystalline by X-ray diffraction criteria. Such crystalline compositions are capable of being formed into strong filaments exhibiting preferential orientation along the fiber axis, as is shown in U. S. 2,233,442. While such filaments have high tensile strengths when in unknotted condition, it has been common experience that they have lower strength when knotted, probably due in part to the relatively low shear strength of the oriented, crystalline filaments.

It is, therefore, an object of the invention to provide a method whereby the knot strength of filaments of crystalline polymers may be improved. A related object is to provide a method whereby the strength of a knotted filament of an oriented crystalline vinylidene chloride polymer may be improved.

It has now been found that the foregoing and related objects may be attained, and that the tensile strength of knotted crystalline polymer filaments may be improved, by tying the knot under temperature conditions such that the knot is pulled tight at from 30° to 80° C., and preferably between 40° and 50° C. The knot may be formed at any desired or prevailing temperature, but should not be drawn tight until the filament, or that portion of it which is involved in the knot, is warmed to a temperature in the recited range.

When a crystalline polymer filament is knotted at or below room temperature to form an overhand knot, for example, and then pulled to determine its breaking strength, this value is usually no more than half the strength of an unknotted section of the same filament. When, however, the knot is drawn tight at a temperature above 30° C., and preferably between about 40° and 50° C., the knotted filament has an improved strength which, at the preferred temperatures, is ordinarily two-thirds that of the unknotted filament. This improvement represents an increase of about 5,000 to 10,000 pounds or more per square inch in the tensile strength. When it is considered that an overhand knot in cotton, silk, or linen cordage, such as is used in making fish-lines, makes the line only half as strong as the unknotted cord, the present improvement is particularly unexpected and advantageous.

The following table shows the variation in tensile strength of knotted filaments of various crystalline vinylidene chloride polymer filaments, with changes in the temperature conditions under which they were tied. The values given are averages of closely agreeing values obtained in a number of tests, using different knots. All tensile strengths were tested after the knotted cord had cooled to room temperature of about 22° C. A sample A was a plasticized filament of 90 per cent vinylidene chloride and 10 per cent vinyl chloride. Sample B was a filament of 93 per cent vinylidene chloride and 7 per cent vinyl acetate. Sample C was a filament of 95 per cent vinylidene chloride and 5 per cent of vinyl cyanide.

Table

Knot-strength, pounds per square inch, for knots tied at indicated temperatures:

| Temperature, °C. | A | B | C |
| --- | --- | --- | --- |
| 5 | 8,000 | | |
| 10 | 11,000 | 12,000 | 11,500 |
| 15 | 13,500 | 15,000 | |
| 20 | 15,500 | 17,500 | |
| 25 | 18,000 | 19,000 | 17,000 |
| 30 | 20,500 | 22,000 | 20,000 |
| 35 | 22,000 | 24,000 | 23,000 |
| 40 | 23,500 | 24,000 | |
| 45 | 23,500 | 22,000 | |
| 50 | 23,000 | | 24,000 |
| 60 | 23,000 | 21,000 | 24,000 |
| 70 | 23,000 | 22,500 | 23,500 |
| 80 | 23,500 | 26,000 | 23,000 |
| 90 | 23,500 | | 18,500 |
| 95 | 23,500 | | 17,500 |
| Original strength (unknotted) | 32,000 | 36,000 | 35,000 |

Similar results have been obtained with numerous filaments and cordage samples of different crystalline polymers. It should be noted that the temperature at which the knot is tied is considerably below any temperature which could result in fusing or welding the crossed filaments in the knot.

The invention has advantage wherever high strength is required in knotted filaments of crystalline polymers, as, for example, in the field of fly-fishing leaders, where such filaments have found wide use, as well as in numerous other fields where such cordage may be employed. The knots whose strength is improved may be any of a variety of simple and complex knots, including overhand, figure-eight, turle, fishermen's, bowline, barrel, square, and numerous other knots.

I claim:

1. The method which comprises forming a knot in a filament of an oriented crystalline polymer, and drawing the knot tight while the portion of the filament in the knot is at a temperature between about 30° and about 80° C.

2. The method which comprises forming a knot in a filament of an oriented crystalline polymer, and drawing the knot tight while the portion of the filament in the knot is at a temperature between about 40° and about 50° C.

3. The method which comprises forming a knot in a filament of an oriented crystalline vinylidene chloride polymer, and drawing the knot tight while the portion of the filament in the knot is at a temperature between about 30° and about 80° C.

4. The method which comprises forming a knot in a filament of an oriented crystalline vinylidene chloride polymer, and drawing the knot tight while the portion of the filament in the knot is at a temperature between about 40° and about 50° C.

HAROLD L. HEARNS.